Figures 1, 2, 3:
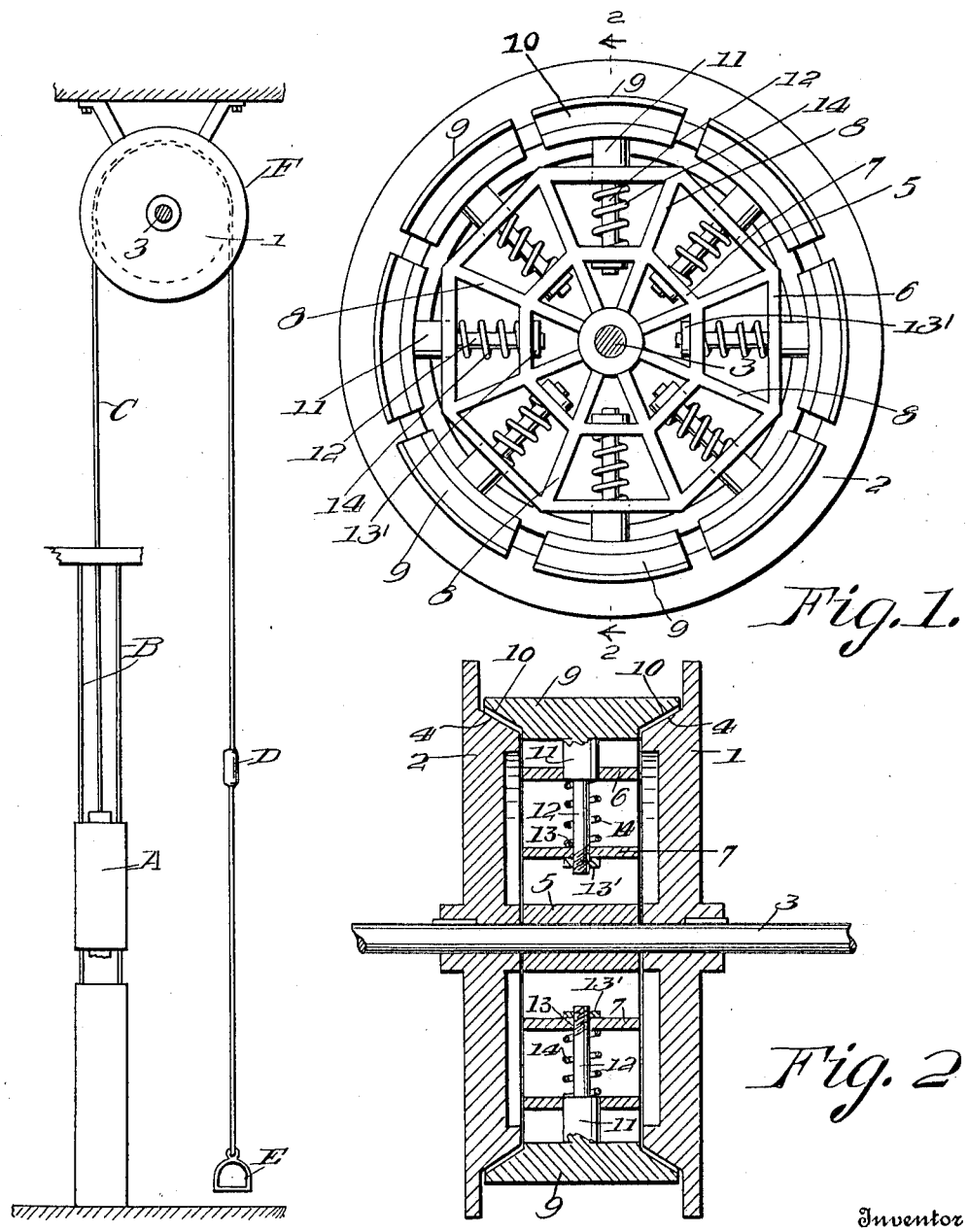

W. H. POND.
LIFTING PULLEY.
APPLICATION FILED JAN. 3, 1912.

1,055,223.

Patented Mar. 4, 1913.

Witnesses
Ada E. Hagerty
Isabella D. Hagerty

Inventor
William H. Pond
By Joseph H. Miller
Attorney

UNITED STATES PATENT OFFICE.

WILLIAM H. POND, OF PROVIDENCE, RHODE ISLAND.

LIFTING-PULLEY.

1,055,223.  Specification of Letters Patent.  Patented Mar. 4, 1913.

Application filed January 3, 1912. Serial No. 669,293.

*To all whom it may concern:*

Be it known that I, WILLIAM H. POND, a citizen of the United States, residing at Providence, in the county of Providence and State of Rhode Island, have invented a new and useful Improvement in Lifting-Pulleys, of which the following is a specification.

This invention relates to certain new and useful improvements in lifting pulleys, and pertains more particularly to a pulley used in connection with jewelers' stamps.

In the drawings, Figure 1 is a side elevation of the invention, showing one of the side plates removed. Fig. 2 is a section on the line 2—2 of Fig. 1, and Fig. 3 is a side elevation of the invention as in use.

In jewelers' stamps the weight or stamp A travels on guides B, the top of the weight or stamp having a rope or leather belt C attached thereto. A hand knob D is secured to the belt and the free end of the latter has a foot stirrup E secured thereto. The stamp A is possessed of considerable weight, and if permitted to drop on the hand of the operator oftentimes effects serious injury. To lift the weight the operator grasps knob D by pulling down on the belt, the belt passing over the pulley F which is supported overhead. In devices of this kind the continual rotation of the pulley gradually burns the rope or belt, causing a weakening thereof, eventually resulting in a break, causing the weight to drop on the hand of the operator.

The present invention has for its objects the provision of a device which will prevent burning, or wearing, or weakening, of the belt with the result above noted.

The device consists of two side plates 1 and 2 that are rigidly keyed to a continuously rotated shaft 3, whereby the plates 1 and 2 rotate therewith. Each plate has a beveled peripheral face 4, which faces incline toward one another at their inner sides. Freely rotatable on the shaft 3 and surrounding the same is a spider frame 5 which consists of spaced inner and outer concentric members 6 and 7 connected by radial spokes 8. The pulley periphery or tread is composed of a plurality of segments 9 each having its side faces formed with beveled portions 10 to conformably engage the beveled portions 4 of the plates 1 and 2. Each segment has an inwardly extending enlarged part 11 that terminates in a reduced shank 12, each part 11 sliding through an aperture provided therefor in the member 6 of the spider, and the shank 12 slides through a perforation 13 formed in the member 7 of the spider and has a nut 13' for limiting its outward movement. A coil spring 14 surrounds each shank 12 and at one end abuts part 11 and its other end seats on the periphery of the member 7 of the spider.

In operation it will be understood that under normal conditions the segments are forced outwardly by their respective springs so as to be held free of contact with the beveled peripheries of the side plates 1 and 2. When the operator grasps the knob D and pulls down on the belt, the weight of the stamp and belt causes four of the segments or half of the circumference of the wheel to be depressed against the actions of the springs, causing the beveled faces 10 of the four segments to frictionally engage the beveled faces 4 of the plates 1 and 2, and as the plates 1 and 2 are keyed to shaft 3 and rotate therewith, it will be seen that the segments will be caused to rotate with the shaft thereby causing the belt which engages the segments to move, effecting lifting of the weight. When the operator releases the belt and permits the weight to drop to operative position, the segments will be lifted by the spring, and the side plates will revolve independent of the segments, and since the latter remain quiescent there will be obviously no wear or burning of the rope or belt.

Having thus described my invention, I claim as new and desire to secure by Letters Patent:—

1. A pulley including in combination with a continuously driven shaft, a pair of spaced plates secured to the shaft so as to rotate therewith, each of said plates having a beveled peripheral portion, a spider on the shaft and composed of inner and outer spaced concentric members secured to one another and placed on the shaft so as to rotate independent thereof, a series of segments having beveled portions to engage with the beveled portions of the plates to cause movement of the segments with the pulley when so engaged, each segment having an outwardly projecting enlarged part and a reduced shank at the inner end of said part, said parts and shanks being received in openings provided therefor in said spider members, and a coil spring surrounding each shank and having one end engaged with the said enlarged part thereof, and having its opposite end engaged with the inner of said spider members to normally force the segment outwardly.

2. In a pulley, a pair of spaced side plates, a shaft rigidly connected to said plates, a spider freely mounted on the shaft, a series of spring pressed segments of greater width than that of the belt for positive and direct engagement at their ends with the plate peripheries, and means between the ends of the segments for slidably connecting the segments to the spider.

In testimony whereof I have signed my name to this specification in the presence of two subscribing witnesses.

WILLIAM H. POND.

Witnesses:
ADA E. HAGERTY,
J. A. MILLER.

Copies of this patent may be obtained for five cents each, by addressing the "Commissioner of Patents, Washington, D. C."